Nov. 23, 1965  D. R. SAWLE  3,218,802
BINARY VAPOR POWER PLANT
Filed Nov. 28, 1960  5 Sheets-Sheet 5

INVENTOR.
DAVID R. SAWLE
BY
ATTORNEY

United States Patent Office 3,218,802
Patented Nov. 23, 1965

3,218,802
BINARY VAPOR POWER PLANT
David R. Sawle, Lafayette, Calif., assignor to Aerojet-General Corporation, Azusa, Calif., a corporation of Ohio
Filed Nov. 28, 1960, Ser. No. 72,075
20 Claims. (Cl. 60—38)

This invention relates to binary vapor power plants and has for its object to improve the power efficiency of the conventional binary power plant.

Numerous means have been deviced for increasing thermal efficiency of power plants. However, all known methods of improving efficiency experience a basic limitation whereby increasing the heat supplied to the working fluid does not correspondingly increase the heat rejected or work output. For example, the use of the regenerative cycle widely used for feedwater heating requires an increase in the heat supplied per unit of heat rejection.

In the regenerative cycle, a portion of the steam flowing through the turbine is withdrawn at an intermediate stage of the adiabatic expansion. By means of a heat exchanger, the withdrawn steam is used to raise the temperature of the condensed liquid that has passed through all stages of the turbine. This eliminates to some extent the irreversible flow of heat that takes place if the condensed liquid is pumped directly into the boiler. In the latter case, the entire flow of heat into the condensate is from a system at a much higher temperature, while if some of this heat is supplied by steam withdrawn from an intermediate turbine stage, where its temperature is intermediate between that of the condenser and the boiler, there is an approximation to the reversible heating process. The reversible process can be defined as a succession of equilibrium states, or states that depart only infinitesimally from equilibrium.

In similar fashion, binary vapor cycles have been proposed and such systems have been in operation since the early 1920's. The outstanding example of the binary vapor cycle lies in the mercury-steam plant. In this system, a mercury boiler is used to vaporize mercury at a high temperature level and thereafter pass through a mercury turbine producing power and then exhausted to a "condenser-boiler" where the condensing mercury vapor gives up heat to water, producing steam at some reasonable pressure. This steam, separately superheated, is taken to a conventional steam turbine, where additional power is produced. In this system again, the increase in thermal efficiency results from an increase in heat supplied per unit of heat rejected.

The achievement of high economic efficiency in a nuclear power plant has been hampered by the difficulty of producing superheated steam in such a plant. Since the reactor represents a large fraction of the capital cost, more electrical output per thermal megawatt of reactor rating simultaneously reduces the fixed charges per unit of output attributable to amortizing the capital investment in the reactor. Thus, higher thermal efficiency has a far reaching and, in fact, a dual effect in reducing power cost in a nuclear plant.

The application of a binary vapor cycle to a nuclear power plant is one means of increasing the efficiency. Mercury can be used for this application, but its large thermal neutron absorption cross-section eliminates it from use in a thermal reactor. In addition, to obtain an efficiency of the order of 50%, relatively high pressure must be used. The economical operation of a binary vapor nuclear power plant depends upon the discovery of suitable coolants for a nuclear reactor operating at reasonable temperatures and pressures which have the necessary thermodynamic properties for use as a topping cycle over a steam power plant.

In accordance with my present invention, I have overcome many of the undesirable disadvantages of the low efficiency of the conventional binary vapor power plant and the limitations of a nuclear reactor used in combination with a typical binary vapor cycle. The present invention provides sulfur or sulfur compounds used as a working medium and within the combination of a heat source, a heat engine, a heat sink, and connecting piping between these components to enable circulation of the working fluid. The secondary cycle is a conventional steam power plant and contains a heat source, a heat engine, heat sink with connecting piping between each component to circulate a working fluid such as steam. The cooling side of the primary cycle heat sink may serve as a secondary cycle heat source. Energy is obtained from both the primary and secondary cycles.

The preferred form which the invention may assume is illustrated in the accompanying drawings in which.

Before explaining the present invention in detail, it is to be understood that the invention is not limited in its application to the details of construction and the arrangement of parts illustrated in the accompanying drawings, since the invention is capable of other embodiments and of being carried out in various ways. Also, it is to be understood that the phraseology or terminology employed is for the purpose of description and not of limitation.

Figure 1:
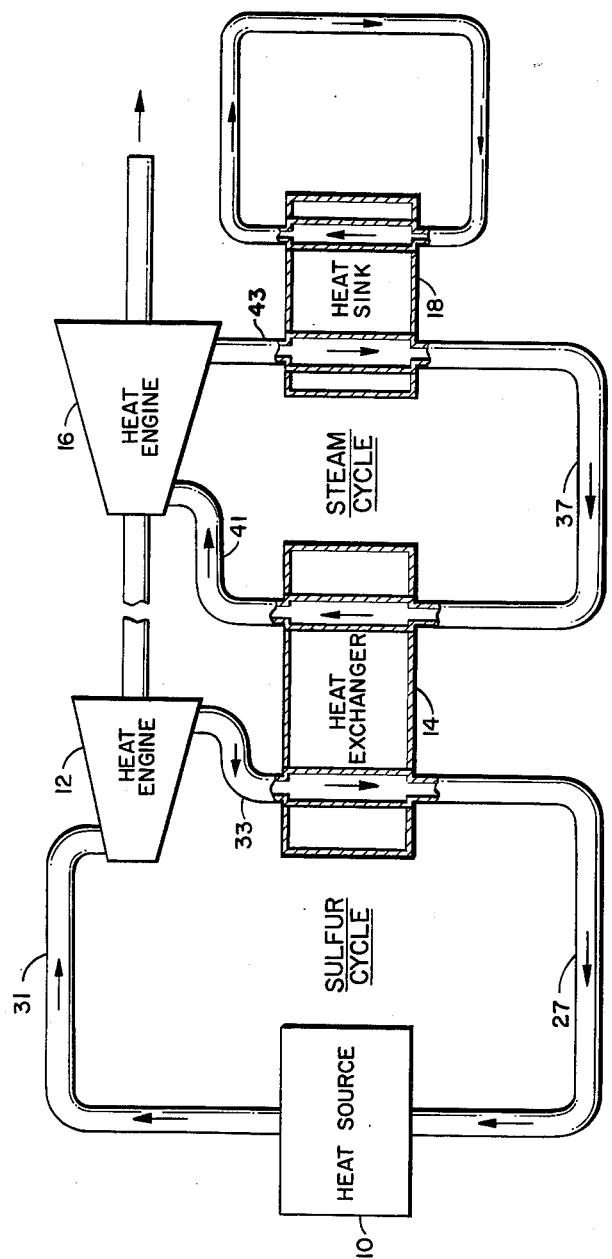
FIG. 1 is a flow diagram showing the basic binary vapor cycle as applied to the present invention.

Referring to FIG. 1, a conventional binary vapor cycle is illustrated and the cycle is composed of a sulfur vapor cycle and steam vapor cycle. The sulfur cycle consists of a heat source 10 used to heat and vaporize sulfur, a sulfur heat engine 12 used to receive vaporized sulfur and to convert part of the heat of the vaporized sulfur into kinetic energy, and a heat exchanger 14 is used to receive the partially cooled sulfur and to remove the remainder of the heat. Conduit means or passageways 31, 33, and 27 are used to convey the vaporized or liquid sulfur between the main components.

The steam cycle basically consists of a heat source, heat engine, and a heat sink. As is the case in most binary vapor cycles, the "low side" of the steam cycle uses the heat exchanger on the high side of the sulfur cycle as a heat source. The heat exchanger 14 is used as a heat source for steam which is thereafter conveyed via the conduit 41 to the heat engine 16. Another conduit 43 is attached to the outlet of the heat engine 16 and conveys the heat to the heat sink 18. Conduit 37 conveys the condensed steam back to the heat exchanger 14 to repeat the cycle. The energy derived from the heat engines 12 and 16 may be converted into any other type of usable energy by appropriate means. Also the heat derived from the heat sink 18 may be used for other industrial uses.

Some of the properties of sulfur and water-steam are compared in Table I.

*Table I*

|  | $H_2O$ | Sulfur |
|---|---|---|
| Melting point, °F | 32 | 224.6 |
| Boiling point, °F | 212 | 834 |
| Critical Temperature, °F | 703 | 1,900 |
| Thermal neutron cross-section (barns) | .66 | .2 |
| Conductivity (B.t.u./hr. ft. °F.) | .36 | .1 |
| Heat Capacity (B.t.u./lb. °F.) | 1 | .28 |

Figure 2:
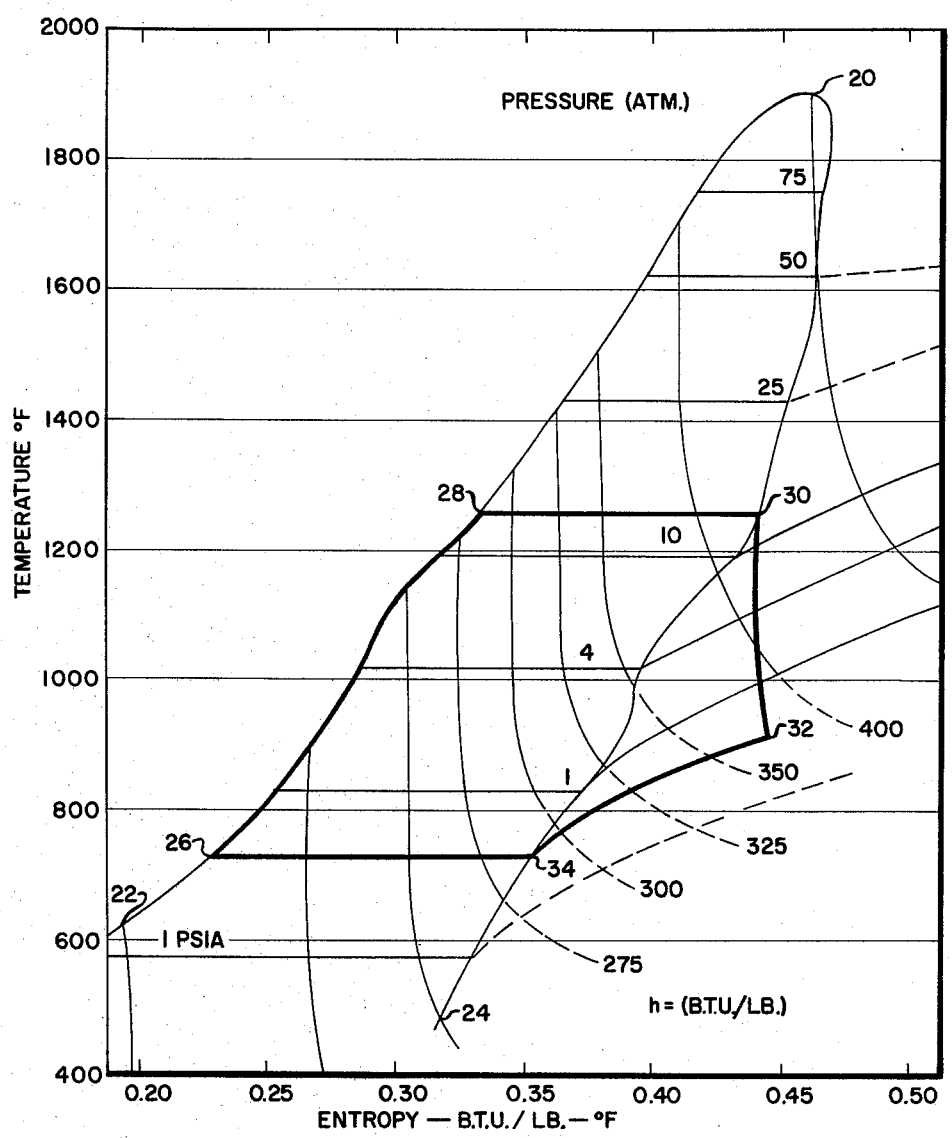
FIG. 2 is a diagram showing the temperature-entropy for sulfur.

To further illustrate the thermodynamic properties of sulfur, the working fluid of the present invention, reference is made to the temperature-entropy diagram shown in FIG. 2. Point 20 represents the critical point for sulfur, that is, the temperature above which it is impossible to liquefy sulfur vapor. Line 22–20 represents the saturated liquid line. Line 20–24 represents the saturated vapor line. The two lines intersect at point 20, the critical point. Points to the left of the saturated liquid line 22–20 indicate liquid sulfur; points to the right of the saturated vapor line 20–24 indicate superheated sulfur vapor; and the area between the two lines indicates a mixture of liquid sulfur and sulfur vapor.

Superimposed upon this temperature-entropy diagram for sulfur is a typical thermodynamic cycle such as would be employed as a topping cycle, indicating the status of the sulfur at various points in the cycle. Point 26 represents the state of the sulfur before it enters the heat source; at this point the sulfur is saturated liquid. As heat is added to the sulfur by the heat source, the temperature and entropy of the sulfur increase until point 28 is reached on the diagram. Since liquid sulfur is nearly incompressible, the line 26–28 represents a constant volume process. The application of additional heat to the liquid sulfur vaporizes the sulfur until point 30 is reached on the diagram. This is a constant temperature process and at point 30 the sulfur is a saturated vapor. Line 26–28–30 represents the addition of heat to the sulfur by the heat source.

Line 30–32 represents the removal of heat and the conversion of same into kinetic energy by a turbine, an example of a heat engine. The expansion of the saturated sulfur vapor through the turbine is a nearly adiabatic process except for small losses. As the sulfur vapor is expanded in the turbine, the vapor is in fact superheated. With decreasing temperature, the corresponding entropy on the saturated vapor line decreases, such that in an adiabatic expansion (constant entropy) the sulfur vapor is superheated. Line 32–34–26 represents the removal of heat from the sulfur vapor in the heat exchanger. Line 32–34 is the desuperheating of the sulfur vapor to a saturated vapor. This is accomplished at constant pressure as is the condensing of the saturated sulfur vapor to a saturated sulfur liquid, line 34–26. The temperature at point 32 represents the highest theoretical temperature to which the steam in the secondary cycle can be raised.

Figure 3:
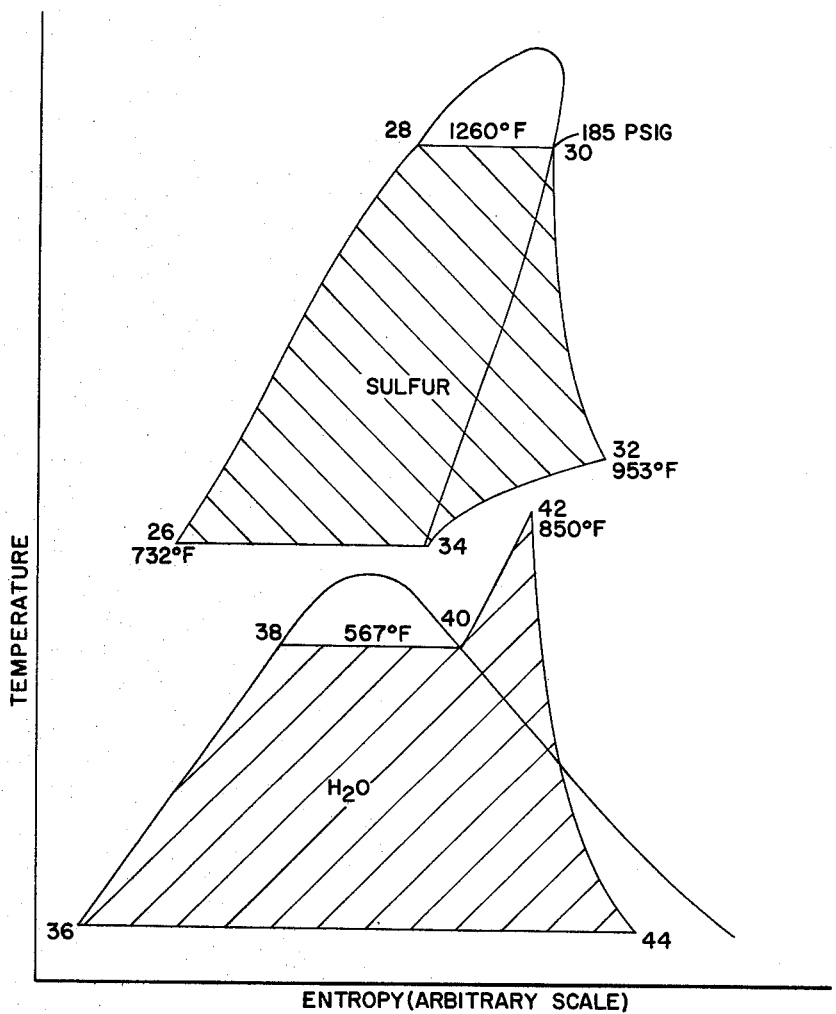
FIG. 3 is a diagram showing the relation of temperature-entropy and illustrating the relationship of the primary and secondary cycles as applied to the present invention.

FIG. 3 represents the relationship of the sulfur topping cycle to a typical steam cycle on a temperature entropy diagram. The sulfur cycle is plotted on a distorted entropy base to compare the cycles on the basis of work done by one pound of steam and by enough pounds of sulfur to generate the pound of steam. Line 36–38=40–42 represents the change of the water into steam as it passes through the heat exchanger 14 and is heated by the cooling sulfur. Line 42–44 represents the passage of the steam through the heat engine and line 44–36 represents the passage through the heat sink.

Figure 4:
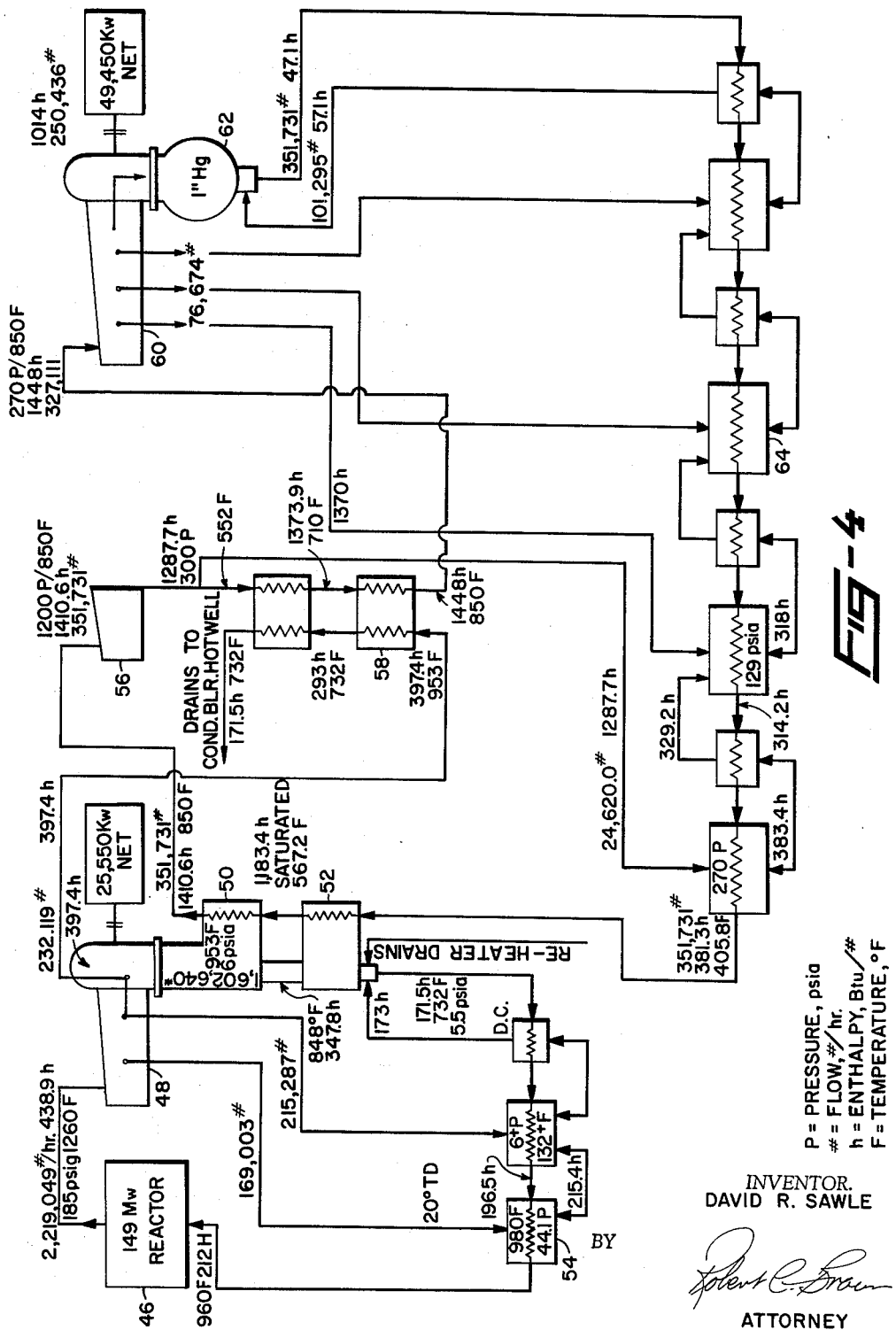
FIG. 4 is a schematic view of the present invention as applied to a 750,000 kilowatt sulfur-steam binary vapor nuclear power plant.

For a specific application of the present invention, reference is made to FIG. 4, a heat balance for a 75,000 kw. sulfur/steam binary vapor nuclear power plant. The boiling sulfur reactor 46 produces 2,219,000 lbs./hr. of saturated sulfur vapor at 1260° F. and 185 p.s.i.g. This vapor is then passed to a 25,000 kw. sulfur turbine 48 which serves as the heat engine for the sulfur topping cycle. The sulfur turbine is arranged for one extraction of 169,000# at the midpoint for the purpose of sulfur feed heating.

In contrast with steam and most vapors, the expansion of sulfur vapor through a turbine results in superheating of the sulfur, rather than condensation. Thus at the exhaust of the sulfur turbine, there is an appreciable degree of superheat. The absence of condensed liquid in the turbine makes a contribution to the efficiency of the turbine. The configuration of the sulfur turbine 48 differs little from a conventional steam turbine of large size. Of primary significance in the design of the sulfur turbine is the large volume flow in the exhaust. The selected turbine exhaust pressure of 6 p.s.i.a. (953 °F.) prevents the specific volume in the exhaust of the sulfur turbine from being excessive. Table II gives the major dimensions for a 1800 r.p.m. turbine.

*Table II*

| Stage No. | Bucket Height, In. | Pitch Diam., In. | Wheel Speeds, ft./sec. | Available Energy, B.t.u./lb. | Stage efficiency, Percent |
|---|---|---|---|---|---|
| 1 | 1.75 | 49.75 | 390 | 12.5 | 84.0 |
| 2 | 4.25 | 52.25 | 410 | 12.5 | 86.0 |
| 3 | 7.60 | 55.60 | 437 | 13.4 | 87.0 |
| 4 | 16.0 | 64.0 | 503 | 13.4 | 88.0 |

At the exhaust of sulfur turbine 48, 215,290#/hr. of sulfur vapor at 953° F. and 6 p.s.i.a. are extracted for feedsulfur heating in the series of sulfur feed heaters 54. An additional 232,120#/hr. are extracted for reheating steam in the series of steam reheaters 58 in the secondary cycle. The remainder of the sulfur turbine exhaust flow is passed to the primary sulfur secondary steam heat exchangers 50. These heat exchangers 50 serve as a sulfur heat sink and the steam heat source. The sulfur vapor passes through a heat exchanger (steam superheater) 50 which reduces the vapor to 848° F. and then is condensed in a sulfur condenser-steam boiler 52 to saturated sulfur liquid at 732° F. and 5.5 p.s.i.a. The hot section of the steam superheater has extended surfaces on the sulfur side (radial fins) with cross flow on the steam side, and a number of passes through the exchanger.

Approximate sizes of both the steam superheater and sulfur condenser-steam boiler are given in Table III. In Table III, the term "LMTD" means Log Mean Temperature Difference and the term "U" designates the heat transfer coefficient.

*Table III*

|  | Duty 10⁶, B.t.u./hr. | LMTD, °F. | U, B.t.u./hr.-ft.²-°F. | Area, sq. ft. | Diam., ft. | Length, ft. |
|---|---|---|---|---|---|---|
| Steam Superheater | 80 | 117 | 15 | 30,100 | 10 | 14 |
| Condenser Boiler | 281 | 219 | 60 | 21,400 | 10 | 10 |

A series of three cascading sulfur feedheaters 54 heat the sulfur to 960° F. before the sulfur is returned to the reactor, which completes the primary cycle.

A pump (not shown) will be required for the forced circulation of the sulfur through the cycle. A 450-horsepower sulfur feed pump is needed and operates at a temperature of 750° F. and is located between the last sulfur feedheater and the reactor.

The secondary steam cycle circulates 351,730#/hr. of fluid. The secondary side of the condenser-boiler 52 receives saturated water at 406° F. and produces saturated steam at 567° F. through the condensation of sulfur vapor on the primary side. The heat exchanger 50 acts as a steam superheater and receives the saturated steam produced in the condenser- boiler 52 and superheats it to 850° F. and 1200 p.s.i.a.

The superheated steam is then passed to a high pressure steam turbine 56 which exhausts steam at 522° F. and 300 p.s.i.a. Steam at a rate of 24,620 lbs./hr. is extracted at the exhaust for feedwater heating, the remainder is reheated in a steam reheater 58 which receives the superheated sulfur vapor from the sulfur turbine exhaust. This steam reheater 58 is a standard shell and tube type heat exchanger. Table IV gives approximate sizes of both sections of this steam reheater.

*Table IV*

| | Duty, B.t.u./hr. | LMTD, °F. | U, B.t.u./hr.-ft.²-°F. | Area, sq. ft. | Diam,. ft. | Length, ft. |
|---|---|---|---|---|---|---|
| Steam Reheater: | | | | | | |
| Cooler Section | 28.2 | 75 | 40 | 9,400 | 6 | 12 |
| Hotter Section | 24.2 | 52.5 | 15 | 30,700 | 7 | 24 |

After reheating to 850° F. and 270 p.s.i.a., the steam is sent to a low pressure turbine 60. The high pressure and low pressure steam turbines 56, 60, combine to be a 50,000 kw. unit, with a hydrogen cooled alternator. The low pressure turbine 60 is arranged for three extractions, totaling 76,674 lbs./hr., for feedwater heating. The exhaust of the low pressure turbine is condensed to 1″ Hg absolute in a conventional steam condenser 62. Before the water is returned to the condenser boiler to complete the secondary cycle, it is heated to 406° F. by a series of cascading feedwater heaters 64.

The heat rate of the power plant is indicated as the energy in-put per each kilowatt hour. It is calculated as the fluid flow rate through the heat source ($W_1$) times the difference in the enthalphy of the fluid leaving the heat source ($h_1$) and the fluid entering the heat source ($h_2$), this quantity divided by the generator output ($Kw$).

$$\text{heat rate} = \frac{W_1(h_1 - h_2)}{Kw}$$

1.5% generator and fixed losses are assumed plus a 1% piping and reactor loss, and the feed pump power is neglected.

$W_1 = 2,219,049$ #/hr.
$H_1 = 438.9$ B.t.u./#.
$H_2 = 212$ B.t.u./#.
$K_w = 75 \times 10^3 \times .99$.

$$\therefore \text{the plant heat rate} = \frac{2,219,049(438.9 - 212)}{75 \times 10^3 \times .99}$$
$$= 6781.2 \text{ B.t.u./kw. hr.}$$

Translated, this means a thermal efficiency of 50.3%.

It has been indicated that the addition of phosphorus to sulfur increases the corrosion resistance of the sulfur. Phosphorus forms a number of sulfur compounds, all of which have vapor pressure characteristics very similar to sulfur. Table V gives a comparison of some of these compounds.

*Table V*

| Compound | Specific Gravity | Melting Point, °C. | Boiling Point, °C. |
|---|---|---|---|
| $P_4S_3$ | 2.03 | 172.5 | 407.5 |
| $P_4S_6$ or $P_2S_3$ | | 290 | 490 |
| $P_4S_7$ | 2.19 | 310 | 523 |
| $P_3S_6$ or $PS_2$ | | 298 | 337 |
| $P_2S_5$ or $P_4S_{10}$ | 2.03 | 276 | 514 |

$P_4S_3$ is the most interesting since it is the most stable (molecular weight is constant to 1300° F.) and it does not exhibit the anomalous viscosity peak common to sulfur in the liquid phase. "Sesquisulfide" phosphorus has a low liquid heat capacity and a lower critical point than sulfur.

A boiling sulfur nuclear reactor 46 is used as the heat source in the system shown in FIG. 4. The characteristics of this reactor 46 are given in Table VI.

*Table VI*

Reactor thermal power, mw. _____ 150.
Electrical power output, mw. _____ 75.
System pressure, p.s.i.g. _____ 185.
Sulfur vapor temperature, F. _____ 1260.
Neutron flux (average), n/cm.²/sec. _____ $3 \times 10^{13}$.
Pressure vessel thickness, in. _____ 1.25.
   Material _____ mild steel.
   Diameter, ft. _____ 15.
   Height, ft. _____ 32.
Core characteristics:
   Core diameter, ft. _____ 10.8.
   Core height, ft. _____ 10.4.
   Reflector thickness, in. _____ 18.
   Total uranium loading, metric tons ____ 11.8.
      Enrichment, percent _____ 1.3.
   Total U-235, kg. _____ 154.
   Average burnup, mwd./ton _____ 14,900.
   Fuel element lifetime, years _____ 4.
   Volume percentage in core—
      Graphite _____ 85.9.
      Sulfur (average 10 lb./ft.³) _____ 10.7.
      Zirconium-aluminum _____ 0.2.
      Uranium carbide _____ 3.2.
   Number of fuel channels _____ 285.

Figure 5:
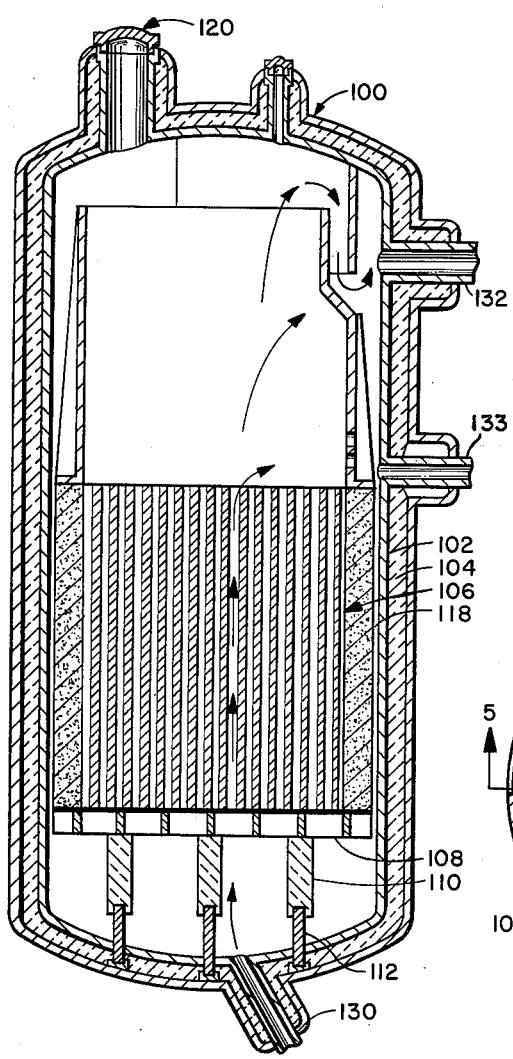
FIG. 5 is a vertical cross-sectional view of a sulfur cooled nuclear reactor taken on line 5—5 of FIG. 6.
Figure 6:
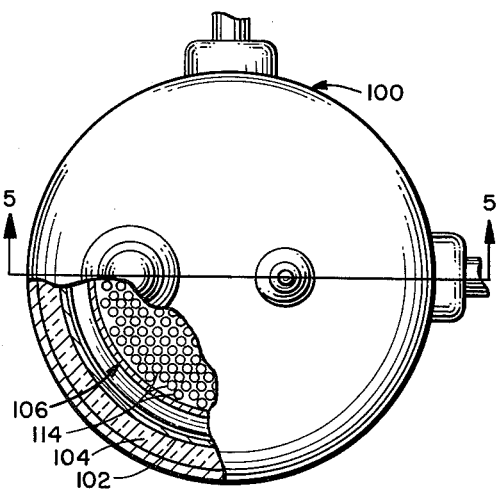
FIG. 6 is an end view partially in cross-section through the riser of the nuclear reactor as shown in FIG. 5.

Referring to FIGS. 5 and 6, a nuclear reactor is shown which may be used in the system shown in FIG. 4. The casing 100 in the pressure vessel 102 is separated by an internal insulation of 4 in. of porous ceramic 104 permeated with liquid sulfur. Liquid sulfur has low conductivity (0.13 B.t.u./hr.-ft.²° F.), making it a good insulator. The core 106 rests upon a base 108 that is supported by posts 110 which pass through the base of the pressure vessel 102. Insulation is maintained by a ceramic block insert 112 in each post 110 at the insulation point.

A graphite core 106 of the reactor is pierced by 285 coolant channels 114 approximately 5 in. in diameter in which the fuel elements 116 are placed. A graphite reflector 118 surrounds the core 106. The core 106 and reflector 118 are made in sections; all parts are coated with silicon carbide, which provides good corrosion resistance to sulfur. The pressure vessel 102 is lined with a sulfur-corrosion resistant alloy which acts as a support for the porous insulation behind it. The lining permits equalization to the liquid sulfur present in the ceramic insulation. It is unnecessary to use a thermal shield in this design due to its large size, relatively low power density, and the thinness of the vessel walls.

Referring to FIG. 5, liquid sulfur enters through the inlet 130, passes through the reactor core 106, and exits through the outlet 132 as a vapor. Since a portion of the sulfur does not vaporize, a liquid sulfur outlet 133 is provided to recirculate the sulfur back to the inlet 130.

Control rods (not shown) enter the core 106 from above, and are mounted on the top of the vessel. The top of the vessel also contains access ports 120 (only one shown) for fuel element changing.

Figure 7:
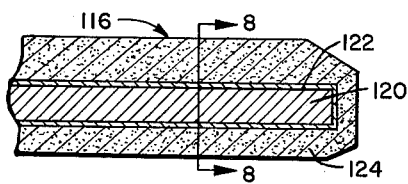
FIG. 7 is a cross section of a fuel element taken along line 7—7 of FIG. 8.
Figure 8:
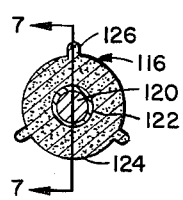
FIG. 8 is a cross-sectional view of the fuel element taken on line 8—8 of FIG. 7.

The reactor fuel element 116 is shown in FIG. 7 and 8 and its characteristics are given in Table VII.

*Table VII*

Fuel elements:

| | |
|---|---|
| Length, ft. | 2.6 |
| Number of fuel elements | 1140. |
| Diameter UC rod, in. | 1.4. |
| Cell diameter, in. | 7.8. |
| Diameter heat transfer surface, in. | 4. |
| Heat transfer area, ft.$^2$ | 3,920. |
| Average heat flux, B.t.u./hr.-ft.$^2$° F. | 130,000. |
| Maximum heat flux, B.t.u./hr.-ft.$^2$° F. | 234,000. |

The fuel element 116 is a uranium-carbide rod 120 1.4 in. in diameter surrounded by a 20 mil zirconium aluminum can 122 to prevent fission product diffusion. This can 122, in turn, is surrounded by a can 124 of graphite 4 in. in diameter. The surface of the graphite is fluted (not shown) to give an increase of 25% to the heat transfer area. The surface of the graphite can 124 is clad with a silicon carbide coating (not shown) which has shown good corrosion resistance to sulfur. Three fins 126, 120° apart, locate the fuel element 116 in the fuel element channel 114. Each channel 114 is 10.4 ft. long and contains a tandem array of fuel elements 116, each 2.6 ft. long. The graphite acts as the structural member and increases the heat transfer area.

Figure 9:
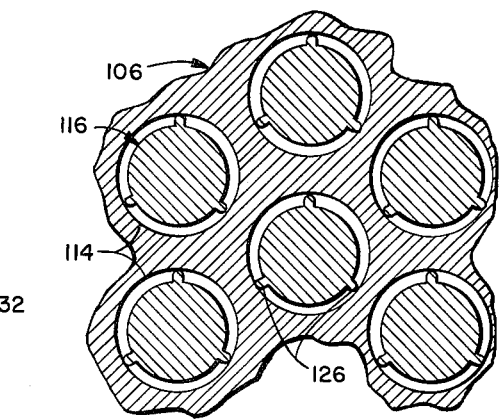
FIG. 9 is an enlarged view of the fuel elements in the nuclear reactor core showing the passages for sulfur.

Referring now to FIG. 9, the fuel elements 116 are shown with the channels 114. The space between fuel elements 116 and the channels 114 is filled with sulfur for cooling purposes.

Fuel element channels 114 are so spaced as to flatten the radial flux distribution. The sulfur flow channel diameter is varied depending on the heat release in the element; each channel has the required flow rate although the slots are identical so the fuel elements may be moved from channel to channel to obtain a uniform burnup. In addition, the channels can be tapered, if desired, to reduce the percentage of sulfur in the core.

The maximum heat flux through the graphite is 234,000 B.t.u./hr./sq. ft. giving a thermal stress in the graphite of about 2,500 p.s.i. The design average heat flux of 130,000 B.t.u./hr./sq. ft. provides sufficient margin with respect to the estimated burnout flux (the transition point between nucleate and film boiling) of 500,000 B.t.u./hr./sq. ft. at a pressure of 185 p.s.i.g. With an over-all hot channel factor (ratio of maximum to average heat transfer flux) of 1.8, the maximum flux is 234,000 B.t.u./hr./sq. ft. For a graphite core of this size, with relatively low power densities, hot-channel factors of 1.8 or lower may be achieved. It is possible to design the core to operate with either natural convection or forced convection. Natural convection requires use of an average annulus width of 0.5 in. rather than 0.375 in., and lower exit vapor quality. Because natural convection would decrease the conversion ratio, forced convection has certain advantages from a nuclear point of view.

Flux distribution calculations indicate that 1.3% enrichment can be used in this configuration, giving a total loading of 154 kg. of U–235 or 11.8 metric tons of uranium. A burnup of 14,900 megawatt-days per ton allows a fuel element lifetime of four years.

This design has extremely high neutron economy due to the small quantity of neutron absorbers in the core. Calculations indicate that an initial conversion ratio of from 0.7 to 0.9 may be obtained. For purposes of this analysis, a conservative ratio of 0.7 has been used.

Since the sulfur in the core represents about 3% in reactivity, loss of sulfur would give a serious increase in reactivity, to be off-set by a resulting temperature rise in the fuel elements. The SiC-coated graphite elements have an extremely high temperature capability, and could therefore withstand such an increase.

The fuel elements have a large heat capacity so that the temperature rise after coolant stoppage is relatively slow— at full power it is 120° F./sec. The system will be designed to initiate simultaneous reactor shutdown if a flow stoppage occurs. Calculations indicate that natural convection will handle the transient (shutdown) energy adequately if the unit is designed for forced convection.

Provisions for such emergency natural circulation are not complex, since they require only a liquid return line from top to bottom of the vessel, with a simple check valve; when the density of sulfur in the core is less than that in the return line, thermal circulation will occur.

Although the invention has been described with a certain degree of particularity, it is understood that the present disclosure has been made only by way of example and that numerous changes in the details and combination and arrangement of components may be resorted to without departing from the spirit and the scope of the invention as hereinafter claimed.

I claim:

1. An improved binary vapor power plant having a closed primary system and a secondary system, said closed primary system comprising: a primary working fluid selected from the group consisting of fluid sulfur and fluid sulfides of phosphorus, a heat source to receive said primary working fluid in a substantially liquid state and to convert said primary working fluid to a substantially saturated vapor state, a heat engine operably associated with said heat source to receive said substantially vaporized primary working fluid from said heat source and to produce a first output of energy by expanding said substantially vaporized primary working fluid against a working surface whereby said substantially vaporized primary working fluid is superheated, a heat exchanger operably associated with said heat engine to receive said superheated primary working fluid from said heat engine and to condense said primary working fluid to a substantially liquid state, and conduit means to transfer said substantially liquid primary working fluid from said heat exchanger to said heat source and thereby complete the cycle of said closed primary system; and said secondary system comprising: a secondary working fluid, said heat exchanger of said closed primary system being included in said secondary system and being disposed to receive said secondary working fluid in a substantially liquid state and to convert said secondary working fluid to a substantially vapor state by the transfer of heat thereto from said primary working fluid, a second heat engine operably associated with said heat exchanger to receive said substantially vaporized secondary working fluid from said heat exchanger and to produce a second output of energy by removing heat from said secondary working fluid and converting the heat removed into energy, and a heat sink operably associated with said second heat engine to receive the secondary working fluid from the second heat engine and to condense said secondary working fluid to a substantially saturated liquid.

2. An improved binary vapor power plant having a closed primary system and a secondary system, said closed pramary system comprising: a primary working fluid selected from the group consisting of fluid sulfur and fluid sulfides of phosphorus, a nuclear reactor to receive said primary working fluid in a substantially liquid state and to supply heat to said liquid primary working fluid for converting said liquid primary working fluid to a substantially saturated vapor state, a turbine operably associated with said nuclear reactor to receive said substantially vaporized primary working fluid from said nuclear reactor and to expand said substantially vaporized primary working fluid to produce a first output of energy and to superheat said substantially vaporized primary working fluid, a condenser operably associated with said turbine to receive said superheated primary working fluid from said turbine and to return said superheated primary working fluid to a substantially liquid state by removing heat therefrom, and conduit means to return said substantially liquid primary working fluid from said condenser to said nuclear reactor and thereby complete the cycle of said closed primary system; and said secondary system comprising: a secondary working fluid, a heater operably associated with said condenser of the closed primary system to receive the heat removed from said primary working fluid by said condenser and to supply said heat to the secondary working fluid, a heat engine operably associated with said heater to receive the heated secondary working fluid from said heater and to produce a second output of energy by the conversion of the heat into energy, and a heat sink operably associated with said heat engine to receive the secondary working fluid from said heat engine and to remove the remaining heat from said secondary working fluid.

3. An improved binary vapor power plant as defined in claim 2 in which a sulfide of phosphorus is the primary working fluid.

4. An improved binary vapor power plant as defined in claim 2 in which the primary working fluid is selected from the group consisting of $PS_2$, $P_2S_3$, $P_2S_5$, $P_3S_6$, $P_4S_3$, $P_4S_6$, $P_4S_7$, $P_4S_{10}$, and mixtures thereof.

5. An improved binary vapor power plant as defined in claim 2 having $PS_2$ as the primary working fluid.

6. An improved binary vapor power plant as defined in claim 2 in which $P_2S_3$ is the primary working fluid.

7. An improved binary vapor power plant as defined in claim 2 having $P_2S_5$ as the primary working fluid.

8. An improved binary vapor power plant as defined in claim 2 in which $P_3S_6$ is the primary working fluid.

9. An improved binary vapor power plant as defined in claim 2 and having $P_4S_3$ as the primary working fluid.

10. An improved binary vapor power plant as defined in claim 2 having $P_4S_7$ as the primary working fluid.

11. An improved binary vapor power plant as defined in claim 2 having $P_4S_6$ as the primary working fluid.

12. An improved binary vapor power plant as defined in claim 2 having $P_4S_{10}$ as the primary working fluid.

13. An improved binary vapor power plant as defined in claim 2, wherein said secondary system is a closed system including conduit means to convey said secondary working fluid from said heat sink to said heater.

14. An improved binary vapor power plant as defined in claim 2 wherein said secondary working fluid is water.

15. A method for generating energy comprising the steps of: heating a primary working fluid selected from the group consisting of fluid sulfur and fluid sulfides of phosphorus in a substantially liquid state to convert said primary working fluid to a substantially saturated vapor; extending said primary working fluid in a substantially saturated vapor state against a working surface to produce a first output of energy and to place said primary working fluid in a superheated vapor state; removing heat from said superheated primary working fluid to return the primary working fluid to a substantially liquid state; and repeating the cycle of steps beginning with the reheating of the substantially liquid primary working fluid; transferring the heat removed from the primary working fluid when in a superheated vapor state to a secondary working fluid in a substantially liquid state to convert said secondary working fluid to a substantially superheated vapor state; passing said substantially superheated secondary working fluid through a heat engine to produce a second output of energy; removing heat from said secondary working fluid as it exits from said heat engine to convert it to a substantially liquid state; and repeating the cycle of steps beginning with the transferring of the heat removed from the primary working fluid when in a superheated vapor state to the substantially liquid secondary working fluid to reheat the substantially liquid secondary working fluid.

16. A method for generating energy as defined in claim 15, wherein said primary working fluid is fluid sulfur.

17. A method for generating energy comprising the steps of: vaporizing a primary working fluid selected from the group consisting of fluid sulfur and fluid sulfides of phosphorus; expanding said vaporized primary working fluid against a working surface to produce a first output of energy and to superheat said vaporized primary working fluid; condensing said superheated primary working fluid; and repeating the cycle of steps beginning with the re-vaporizing of the condensed primary working fluid; vaporizing and superheating a secondary working fluid with the heat released in condensing said superheated primary working fluid; passing said superheated secondary working fluid through a heat engine to produce a second output of energy; condensing the secondary working fluid; and repeating the cycle of steps beginning with the re-vaporizing and re-superheating of the secondary working fluid from the heat released in condensing said superheated primary working fluid.

18. A method for generating energy as defined in claim 17 wherein said primary working fluid is a sulfide of phosphorus.

19. A method for generating energy as defined in claim 17 wherein said primary working fluid is selected from the group consisting of $PS_2$, $P_2S_3$, $P_2S_5$, $P_3S_6$, $P_4S_3$, $P_4S_6$, $P_4S_7$, $P_4S_{10}$, and mixtures thereof.

20. A method for generating energy as defined in claim 17, wherein said primary working fluid is fluid sulfur.

References Cited by the Examiner

UNITED STATES PATENTS

| | | | |
|---|---|---|---|
| 223,555 | 1/1880 | Du Motay et al. | 60—38 |
| 933,023 | 8/1909 | Dankwardt | 60—36 |
| 1,519,353 | 12/1924 | Bowen. | |
| 1,713,416 | 5/1929 | Boertlein. | |
| 3,068,159 | 12/1962 | Borst | 176—57 |

OTHER REFERENCES

CP–3061, June 23, 1945, U.S. Atomic Energy Commission, Technical Information Service, Oak Ridge, Tenn., pp. 2 to 8, 38, 39, 40, 41, 42.

ORNL–360, Aug. 10, 1949, U.S. Atomic Energy Commission, pp. 20, 21, 22, 23, 24, 25, 26, 27, 28, J. Nuclear Energy II, 1957, pp. 124–134 (page 132 particularly relied on).

REUBEN EPSTEIN, *Primary Examiner.*

CARL D. QUARFORTH, ROGER L. CAMPBELL,
*Examiners.*